United States Patent Office 3,185,672
Patented May 25, 1965

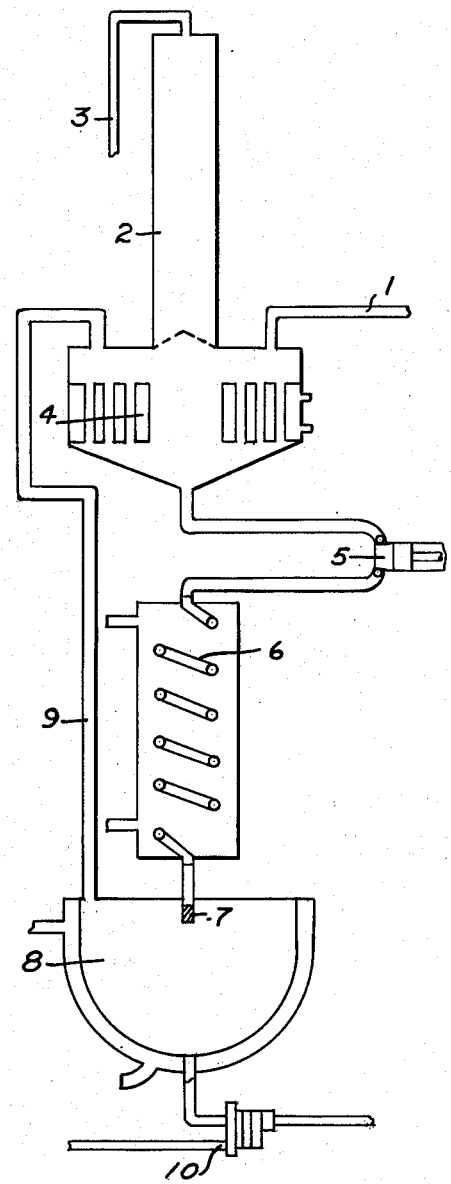

3,185,672
POLYMERIZATION OF AQUEOUS SOLUTIONS OF POLYAMIDE-FORMING REACTANTS WITH ADIABATIC EXPANSION THEREOF
Philip Francis Clemo, Tynemouth, Northshields, James Anthony Briggs, Croesyceiliog, Cwmbran, William Wilson, Abergavenny, and John Anthony Carter, Newport, England, assignors to British Nylon Spinners Limited, Pontypool, England
Filed May 26, 1960, Ser. No. 32,048
Claims priority, application Great Britain, June 6, 1959, 19,408/59
3 Claims. (Cl. 260—78)

This invention relates to the manufacture of high molecular weight polyamides by the condensation polymerisation of polymethylene diammonium salts, and especially to a continuous process for carrying out said polymerisation.

As compared with a batch process or discontinuous process for polymerising polymethylene diammonium salts, e.g., for the polymerisation of hexamethylene diammonium adipate in order to obtain polyhexamethylene adipamide, a continuous process offers some advantages, for instance, the attainment of a high degree of uniformity, and many such processes have been made the subject of patent protection (compare: United States patent specification No. 2,361,717 and British patent specifications Nos. 674,954, 777,943 and 801,058). The present advantageous process is distinguished by its characteristically brief initial high pressure stage ending in adiabatic expansion.

Thus in United States specification No. 2,361,717 a continuous process for preparing polyamides is described which consists in passing an aqueous solution of a di-amino-dibasic carboxylic acid salt, e.g., hexamethylene diammonium adipate, at superatmospheric pressure and at amide-forming temperatures through at least one compartment of a reaction assembly having several compartments, the temperature-pressure conditions in said compartment preventing the formation of steam and the rate of travel of said solution through said compartment being such that the major portion of said salt is converted to polyamide, then passing the reaction mass at amide-forming temperatures and at a pressure permitting the formation of steam through at least one additional compartment of the assembly while progressively removing water from the reaction composition as steam until the composition consists essentially of polyamide and the pressure is substantially atmospheric.

Furthermore in British patent specification No. 674,954, there is described a process for the manufacture of synthetic linear polyamides which comprises passing an aqueous solution of a diamine dibasic carboxylic acid salt through a reaction zone at amide-forming temperature and under superatmospheric pressure at such rate that the major proportion of said salt combines to form polyamide and water is vaporised, then passing the resultant reaction mass through a second reaction zone at amide-forming temperature where polymerisation is substantially completed by maintaining the reaction mass under temperature and pressure conditions under which further water is vaporised and the remaining reaction product is substantially polyamide and finally passing the polyamide composition so formed through a third zone at substantially atmospheric pressure and a temperature above the melting point of the polyamide where polymerisation is completed.

The polymethylene diammonium salts for instance hexamethylene diammonium adipate which are obtained by reaction of hexamethylene diamine and adipic acid, are conveniently employed in the form of their aqueous solutions and one of the desiderata is to ensure that the conditions of pressure and temperature are such that no solid salt phase separates from the aqueous reaction mixture when water is removed by evaporation.

At the commencement of the polymerisation, as the reaction proceeds, salt is consumed, becoming first transformed into low molecular weight polyamide. Surprisingly enough it has now been observed that the presence of the latter in the reaction mixture will prevent the separation of salt under conditions of pressure and temperature which would otherwise cause precipitation, provided that the mixture of low molecular weight polyamide and salt corresponds to an overall degree of polymerisation of from 1.15 to 1.37. Experiments show that this polymerisation involves approximately a conversion of from 23% to 44% of the salt into low molecular weight polyamide. Thus it has been discovered that mixtures of a polymethylene diammonium salt and polyamides formed therefrom (which in practice may contain up to 30% water calculated on total salt plus polyamide) constitute, provided that the molecular weight of the polyamide falls within the aforesaid limits, transparent mobile solutions at temperatures ranging as far as 10° to 20° C. below their boiling points at atmospheric pressure (i.e., 760 mm. of mercury). Such solutions are accordingly easy to handle, for instance, to pump through pipelines. They are also conveniently stored. Any cloudiness or precipitate developed on cooling clears when heat is applied. These solutions, which form a characteristic stage in the present improved process for making polyamides will be referred to henceforth as prepolymer solutions for convenience.

These prepolymer solutions are produced by continuously passing a hot aqueous solution of the polymethylene diammonium salt through a tube at polyamide-forming temperatures under pressure which, when the required degree of polymerization as mentioned above, has been attained, is suddenly released so that the resulting expansion is approximately adiabatic. In this way a rapid evaporation of water is produced which both cools and concentrates the reaction mixture. Cooling may thus be said to be effected without wastage of heat. The polymerisation may be completed at atmospheric pressure or higher pressures.

If the polymerisation be completed at atmospheric pressure, it can conveniently be effected continuously because it is possible to heat the aforesaid prepolymer solutions even at atmospheric pressure, until the stage of molten high molecular weight polyamide is reached, without the separation of solid, in other words, as a single-phase system. This procedure has the advantage that only a minor portion of the salt is converted to polyamide, in the initial high pressure stage (involving relatively costly plant). In the superatmospheric pressure stages of the processes of both United States patent specification No. 2,361,717 and British patent specification No. 674,954, on the other hand, a major portion of the salt is converted to ployamide. Furthermore by completing the reaction at atmospheric pressure, the overall time of polymerisation tends to be reduced (as compared with pressure polymerisation under similar conditions) since the removal of water is facilitated. Loss of diamine, though apt to occur, can easily be prevented by recovering any diamine from the gases evolved by means of a condenser, and returning it to the reaction mixture.

If the present process of polymerisation be completed at superatmospheric pressure by charging the prepolymer solutions into suitable apparatus such as an autoclave, important economic advantages again accrue, inasmuch as the said prepolymer solutions constitute a more concentrated form of polyamide-yielding material than any previously described, which are also easily handled, that is to say, capable of being pumped through pipelines without any danger of the separation of a precipitate under practical or easily realisable conditions of temperature and pressure.

Accordingly the present invention consists of a process for the manufacture of high molecular weight polyamides by the condensation polymerisation of polymethylene diammonium salts of aliphatic alpha, omega-dicarboxylic acids, which salts contain from 8 to 24 carbon atoms, comprising pumping a hot aqueous solution of the salt containing 45–70% by weight thereof through a pressure tube at polyamide-forming temperatures under a pressure at least sufficient to prevent the evolution of steam and for a time such that a degree of polymerisation of from 1.15 to 1.37 is attained, suddenly reducing the pressure to atmospheric pressure by passing the resulting prepolymer solution through a jet or valve into a chamber at substantially atmospheric pressure so that the ensuing expansion is approximately adiabatic and heating in order to complete the polymerisation in said chamber and/or one or more further vessels, at atmospheric or higher pressures, the water of reaction being removed in the form of steam.

The invention includes high molecular weight polyamides when manufactured by the above process.

The temperature of the initial salt solution must clearly suffice to hold the given concentration of salt in solution. For example, 70 parts by weight of hexamethylene diammonium adipate are soluble in 30 parts by weight of water, so as to constitute a solution containing 70% by weight of salt, at 111° C. The pressure in the pressure tube may amount to, for instance, 300–5000 lbs. per sq. in., but 800–1000 lbs. per sq. in. is preferred. Thus in the case of a hexamethylene diammonium adipate solution containing 65–70% by weight of salt, the temperature of the initial solution may be 111° C., the temperature of the presure tube 260° C., and the pressure thereof 620 lbs. per sq. in. Under these conditions the time of passage through said pressure tube would need to amount to about 1 minute.

Examples of suitable polymethylene diammonium salts for use in the present process are the following:

hexamethylene diammonium adipate
hexamethylene diammonium sebacate
octamethylene diammonium adipate
decamethylene diammonium adipate
pentamethylene diammonium sebacate
dodecamethylene diammonium adipate The release valve can conveniently be an automatic reduction valve, designed to pass the solution to a nozzle or other spraying device so that it is sprayed out, as soon as a predetermined threshold presure is reached, but an adjustable valve or simple jet may also be employed. The spray is desirably such that the liquid is in the form of small droplets so as to ensure a large gas-liquid interface.

The chamber at atmospheric pressure is filled with steam above the liquid level. After the pressure has been reduced to that of the atmosphere, the polymerisation can be conveniently completed by further heating at, say, from 270° to 300° C. The expression substantially atmospheric pressure signifies that the pressure in question need not correspond precisely with that of the atmosphere but may differ therefrom by a small amount such as that due to a water seal or column of liquid reagent, for instance. Such small pressure differences can be assumed to be of the order of a few percent of an atmosphere.

In the present process of manufacture of polyamides there may be included in the reaction mixture monofunctional compounds in small quantity, notably monoamines or monobasic acids, e.g., acetic acid, in order to prevent polymerisation proceeding beyond the desired degree of elevated temperatures, for example, when the polyamide is held molten for the purpose of melt-spinning. Such monofunctional compounds are known as viscosity stabilisers. Other adjuvants may also be added at any convenient stage of the process, for instance: dyes, pigments, dyestuff formers, plasticisers, delustrants, polyamide and other resins.

The following examples are intended to illustrate, not limit, the invention.

*Example 1*

The first stage of an apparatus suitable for polymerising hexamethylene diammonium adipate salt, in accordance with the process of the present invention, is illustrated diagrammatically in the drawing accompanying the provisional specification, wherein the numbers have the following significations:

1, pipeline
2, fractionating column
3, steam outlet
4, calandria heat exchanger
5, pump
6, coil heat exchanger (or pressure tube)
7, release valve and spray nozzle
8, spray chamber at atmospheric pressure
9, pipeline
10, gear pump In working the process of the invention, one admits at a temperature of 80° C. an aqueous solution containing 60% by weight (calculated on the solution) of hexamethylene diammonium adipate, continuously through pipeline 1, into the calandria heat exchanger 4, which is kept at a temperature of 111° C. by means of superheated steam. As the salt solution travels through the calandria heat exchanger it is concentrated from 60 to 70%.

This concentrated solution is forced by pump 5 into the coil heat exchanger 6 which constitutes the pressure tube. The latter has an internal diameter of 0.194 inch and is 25 feet long. The tube is heated by a 1:1 mixture of diphenyl and diphenyl oxide, circulating in the jacket, to a temperature of 260° C. The pressure within the tube is maintained at 900 lbs. per sq. in. by the automatic release valve 7 which has the form of an orifice sealed by a spring-loaded ball. The time taken for the concentrated solution to pass through the pressure tube is 65 seconds. During this period no further concentration of the solution occurs, but some polymerisation takes place. The degree of polymerisation reached is 1.15.

The solution leaves the pressure tube through the release valve and nozzle 7, and enters the chamber 8, the pressure being suddenly reduced to atmospheric pressure. The prepolymer solution issues from the nozzle in the form of a finely divided spray. The remaining water is thus removed from the concentrated solution but no solid phase separates. A small quantity of a molten mixture of salt and polyamide is maintained in the bottom of the chamber 8, which has an outlet 9 communicating with the top of the heat exchanger 4, which serves to carry off the steam. The chamber 8 is heated in the same manner and to the same temperature as the pressure tube 6.

The calandria heat exchanger 4 is surmounted by the fractionating column 2 which is maintained at 100° C., so that whilst the steam escapes through the outlet 3, any hexamethylene diamine entrained therewith is condensed and returned to the salt solution. The melt which constantly collects in the bottom of chamber 8 is forwarded by the pump 10 to another vessel (not illustrated), similarly heated, in which the process of polymerisation is completed at atmospheric pressure.

The resulting polyhexamethylene adipamide is found to possess a high degree of chemical uniformity.

*Example 2*

The apparatus employed for the first stage of the polymerisation is similar to that described in Example 1.

An aqueous solution containing 47% (calculated on the solution) of hexamethylene diammonium adipate and ¼% of acetic acid is pumped through the pressure tube which is held at 260° C. by a jacket filled with the vapours of a 1:1 mixture of diphenyl and diphenyl oxide. The degree of polymerisation reached (i.e., in the prepolymer solution) is 1.2, the release valve being so adjusted that a pressure of 950 lbs. per sq. inch is maintained in the tube. After passing through the tube, which passage takes 1 minute 40 seconds, the solution of low molecular weight polyamide and salt which collects in the chamber at atmospheric pressure is found to contain 78% total solids. Its temperature is 105° C.

When sufficient of this material has accumulated, it is pumped into an autoclave where it is heated during 30 minutes to 212° C. The steam pressure rises meanwhile to 250 lbs. per sq. inch. Steam is thenceforth released as necessary to prevent the pressure exceeding this limit, the temperature being raised during 20 minutes to 250° C. The pressure is then allowed to fall to atmospheric pressure during a further period of 45 minutes whilst the temperature is further increased to 270° C. This temperature is maintained for 30 minutes longer. The process of polymerisation is then complete.

What we claim is:

1. A process for the manufacture of high molecular weight polyamides by the condensation polymerization of polymethylene diammonium salts of aliphatic alpha, omega-dicarboxylic acids which salts contain from 8 to 24 carbon atoms, comprising pumping a hot aqueous solution of the salt containing from 45 to 70% by weight of said salt through a pressure tube at polyamide-forming temperatures under a pressure at least sufficient to prevent the evolution of steam at said polyamide-forming temperature and for a time such that a degree of polymerization of from 1.15 to 1.37 is attained, suddenly reducing the pressure to atmospheric pressure by passing the resulting solution of prepolymer having said degree of polymerization of from 1.15 to 1.37 through a narrow orifice into a chamber maintained at substantially atmospheric pressure in a manner such that the ensuing expansion is approximately adiabatic, to reduce the pressure of said solution without solidifying it, and then heating said solution at polyamide forming temperature, in order to complete polymerization, at at least atmospheric pressure, the pressure being below that which will prevent the water of reaction being removed in the form of steam.

2. Process for the manufacture of high molecular weight polyamides as claimed in claim 1 wherein the salt is hexamethylene diammonium adipate.

3. Process for the manufacture of high molecular weight polyamides as claimed in claim 2 wherein the pressure in the pressure tube is from 800 to 1000 lbs. per sq. inch and the polymerisation is completed at atmospheric pressure.

References Cited by the Examiner

UNITED STATES PATENTS

| 2,241,322 | 5/41 | Hanford | 260—78 |
| 2,361,717 | 10/44 | Taylor | 260—78 |
| 2,689,839 | 9/54 | Heckert | 260—78 |
| 2,923,699 | 2/60 | Indest et al. | 260—78 |
| 3,027,355 | 3/62 | Taul et al. | 260—78 |

FOREIGN PATENTS

| 674,699 | 7/52 | Great Britain. |

WILLIAM H. SHORT, *Primary Examiner.*

H. N. BURSTEIN, *Examiner.*